Figure 5:
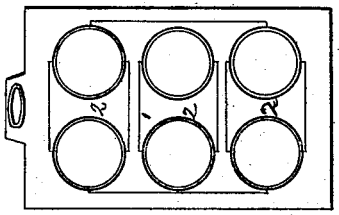

C. J. SHEPARD.
Cooking Stove.

No. 5,351.

2 Sheets—Sheet 1.

Patented Oct. 30, 1847.

WITNESSES

INVENTOR

2 Sheets—Sheet 2.
C. J. SHEPARD.
Cooking Stove.
No. 5,351.
Patented Oct. 30, 1847.
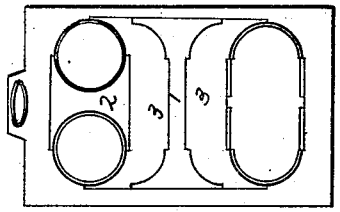
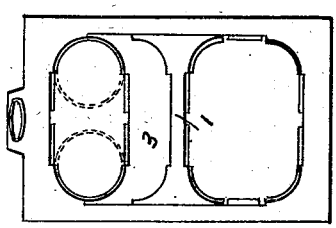
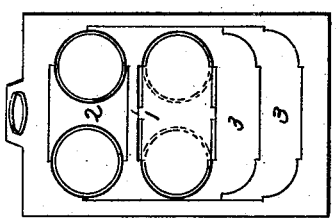
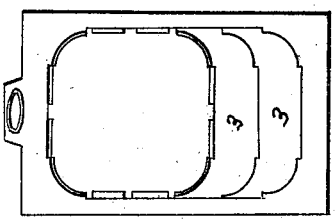
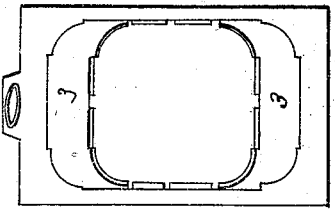
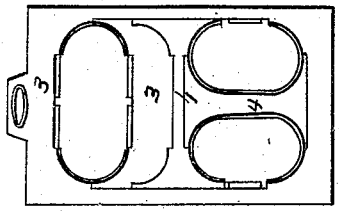
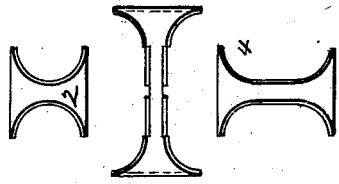
WITNESSES
INVENTOR

UNITED STATES PATENT OFFICE.

CHS. J. SHEPARD, OF NEW YORK, N. Y.

BOILER-PLATE FOR COOKING-STOVES, &c.

Specification of Letters Patent No. 5,351, dated October 30, 1847.

*To all whom it may concern:*

Be it known that I, CHARLES J. SHEPARD, of the city, county, and State of New York, stove and range manufacturer, have invented and made and applied to use certain new and useful improvements forming changeable arrangements for using boiler or other domestic or culinary utensils on the tops of cooking stoves or ranges, for which said improvements I seek Letters Patent of the United States, and that the said improvements are constructively set forth in the following description and shown in the drawing annexed to and making a part of this specification, wherein—

Figure 10:
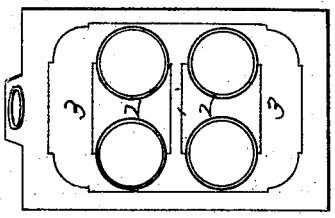
Figure 4:
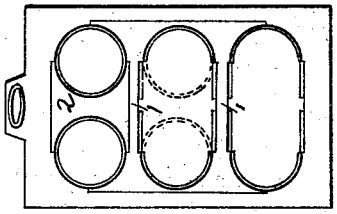
Figure 9:
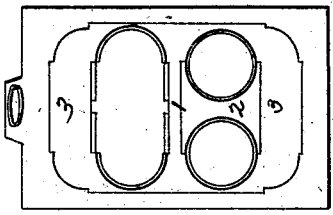
Figure 3:
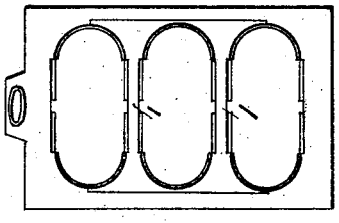
Figure 8:
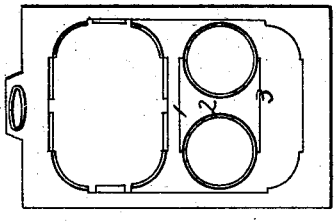
Figure 7:
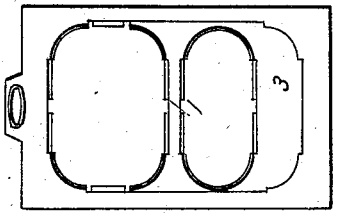
Figure 6:
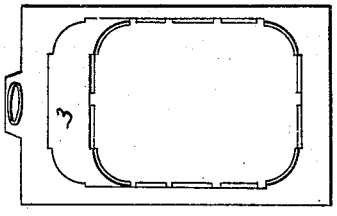

The small figures, numbered 1, 2, 3, 4, show four sizes, and forms, of lift out pieces, or plates, the first of which acts only across the stove top, and the three others act across, and in a part, only, of the length. The Figure 1 represents a stove top, with all these pieces out, leaving a space, wherein to put one large wash boiler; the Fig. 2, represents the same top, with the detached pieces No. 1, in place, to receive one third, and one fifth sized boiler; the Fig. 3, shows two of the same No. 1 pieces in place, to receive three fifth sized boiler; the Fig. 4, shows two No. 1 pieces, with one No. 2 piece, in place, to receive two fifth, and two seventh sized boilers; the Fig. 5, shows two No. 1 pieces, and three No. 2 pieces, to receive six seventh sized boilers; the Fig. 6, shows the space for one second sized boiler, with one No. 3 piece, forming an iron heater plate, behind; the Fig. 7, shows one No. 1 piece, and one No. 3 piece, forming spaces for one fourth sized boiler, and one fifth boiler, with an iron heater plate in front; the Fig. 8 shows one No. 1, one No. 2 and one No. 3 plates, in place, forming spaces for two seventh, and one fourth sized boilers, with an iron heater plate on front; the Fig. 9, shows one No. 1 plate, one No. 2 plate, and two No. 3 plates, forming spaces for two seventh, and one fifth sized boiler, and an iron heater plate, both back and front; the Fig. 10, shows one No. 1 plate, two No. 2 plates, and two No. 3 plates, forming spaces, for four seventh sized boilers, also with an iron heater plate, both front and back; the Fig. 11, shows two No. 3 plates, placed to receive one third sized boiler, and form iron heater plates, both before and behind the boiler; the Fig. 12, shows two No. 3 plates, forming a double sized iron heater plate, in front, and space for one third sized boiler, behind them; the Fig. 13, shows the same two No. 3 plates in front, but having also one No. 1 and one No. 2 plate, giving spaces for one fifth, and two seventh sized boilers; the Fig. 14, shows one No. 1, and one No. 3 piece, in place, forming a middle iron heater plate, between one fourth sized, and one fifth sized boiler; the Fig. 15, shows one No. 1 and one No. 2 plate, with two No. 3 plates, forming a double iron heater plate, in the middle, with one fifth, and two seventh sized boilers, at the end; and the Fig. 16, shows one No. 1 plate, one No. 3 and one No. 4 plate, forming spaces for one fifth boiler, across, and with sixth sized boilers, and one middle iron heater plate.

Figure 2:
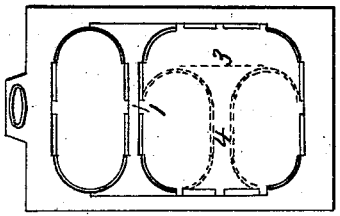
Figure 1:
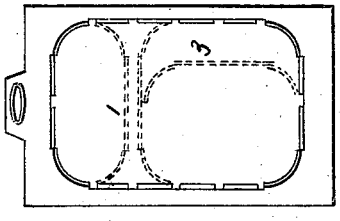

The Fig. 1 shows, by dotted lines, a plate No. 1 and No. 3 forming spaces for one fifth sized boiler, at the back, one fourth sized boiler lengthwise from the former, and an iron heater plate on one side; the Fig. 2 shows one No. 1 piece, and, in dotted lines, one No. 3 and one No. 4 piece, forming spaces for one fifth, and two sixth sized boilers, and an iron heater plate on one side; Fig. 4, shows, by dotted lines, a No. 2 piece added, to form spaces for two seventh sized boilers, in place of one fifth sized boiler; Fig. 13 shows, by dotted lines, a No. 2 piece, completing spaces for four seventh sized boilers, in place of one fifth, and two seventh sized boilers; Fig. 14, shows, by dotted lines, two seventh sized boilers, in the space for one fifth sized boiler; thus arranging, by four forms of lift out plates, twenty different changes, capable of receiving, among them, seven sizes of boilers; and in eleven of the changes, combining the means of heating irons, or placing other articles, to keep them hot; and in all cases, giving the means of placing articles close to, and over the furnace, or at some distance from it; thus measurably regulating the heat, applied to any given article. In all these changes, the use of boilers only, has been named, but the same changes are, severally, and distinctly, applicable to use, with any other culinary or domestic utensils, that family convenience may require. The flue is shown, at the back of the stove, but the position of this, in use, must depend on the situation of the furnace.

The lift out plate No. 1, is so fitted with teeth in the counter rabbet, under each end, matching indentations in the open rabbet around the inside lengthwise edges of the stove top, that it can only be used across the length of the stove, and the use of it, in any other direction, is hereby entirely disclaimed, as similar pieces have already been used, by others, who place them in a part of, or along the whole length of the stove top, while the teeth, on the counter rabbet, above referred to, prevent this piece fitting except across the stove top. The other pieces are fitted with similar teeth, as denoted by slightly dotted lines, on the ends of each detached piece, fitting into the indentations, shown in the open rabbet of the stove top, and the detachable or changeable pieces.

What I claim as, new and of my own invention, and desire to secure by Letters Patent of the United States, is—

The shape or form of the movable No. 3 piece, as new in itself, and the combination therewith, of lift out pieces, of three different forms, to effect twenty, or more different changes, such changes thereby producing the convenience, of using seven different sizes of culinary or other domestic utensils, substantially as described and shown.

In witness whereof I have hereunto set my hand and seal this eleventh day of April, one thousand eight hundred and forty-six.

CHS. J. SHEPARD. [L. S.]

Witnesses:
W. SERRELL,
LEMUEL W. SERRELL.